United States Patent
Akuzawa et al.

(10) Patent No.: US 9,343,910 B2
(45) Date of Patent: May 17, 2016

(54) MULTIPLEX WIRELESS POWER TRANSMISSION SYSTEM AND TRANSMITTING-SIDE MULTIPLEX WIRELESS POWER TRANSMISSION APPARATUS

(71) Applicant: MITSUBISHI ELECTRIC ENGINEERING COMPANY, LIMITED, Tokyo (JP)

(72) Inventors: Yoshiyuki Akuzawa, Tokyo (JP); Yoshiyuki Takahashi, Tokyo (JP)

(73) Assignee: MITSUBISHI ELECTRIC ENGINEERING COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/433,776

(22) PCT Filed: Sep. 2, 2013

(86) PCT No.: PCT/JP2013/073552
§ 371 (c)(1),
(2) Date: Apr. 6, 2015

(87) PCT Pub. No.: WO2014/069093
PCT Pub. Date: May 8, 2014

(65) Prior Publication Data
US 2015/0280446 A1    Oct. 1, 2015

(30) Foreign Application Priority Data

Oct. 31, 2012   (JP) .................. 2012-240782

(51) Int. Cl.
*H02J 17/00*     (2006.01)
*H02J 5/00*      (2016.01)
*H01F 38/14*     (2006.01)

(52) U.S. Cl.
CPC ............... *H02J 5/005* (2013.01); *H01F 38/14* (2013.01); *H02J 17/00* (2013.01)

(58) Field of Classification Search
CPC ...................................... H02J 17/00
USPC ............................ 307/104; 320/108
See application file for complete search history.

(56) References Cited

U.S. PATENT DOCUMENTS

| 2004/0130425 A1* | 7/2004 | Dayan | H04B 5/0037 336/200 |
| 2012/0086281 A1 | 4/2012 | Kanno | |
| 2013/0099588 A1* | 4/2013 | Yeo | H02J 5/005 307/104 |

FOREIGN PATENT DOCUMENTS

| JP | 2001-112253 A | 4/2001 |
| JP | 2004-166323 A | 6/2004 |
| JP | 2012-29471 A | 2/2012 |
| WO | WO 2012/046453 A1 | 4/2012 |

* cited by examiner

*Primary Examiner* — Fritz M Fleming
(74) *Attorney, Agent, or Firm* — Birch, Stewart, Kolasch & Birch, LLP

(57) ABSTRACT

A system includes a primary transmission power supply 1 that provides single frequency power; a transmitter-receiver having plural channels of transmitting antennas 5 that wirelessly transmit power provided from the primary transmission power supply 1 and plural channels of receiving antennas 6 that receive the power transferred from the paired transmitting antennas 5; plural channels of transmission power circuits 2 that establish resonance conditions of the paired transmitting antennas; and plural channels of receiving power circuits 4 that establish resonance conditions of the paired receiving antennas, in which the individual transmission power circuits 2 provide the transmitting antennas 5 of adjacent channels with powers with half-wave resonance waveforms that avoid a period during which the power waves overlap on each other by shifting a phase of voltage or current of the powers.

8 Claims, 2 Drawing Sheets

MULTIPLEX WIRELESS POWER TRANSMISSION SYSTEM AND TRANSMITTING-SIDE MULTIPLEX WIRELESS POWER TRANSMISSION APPARATUS

TECHNICAL FIELD

The present invention relates to a multiplex wireless power transmission system and transmitting-side multiplex wireless power transmission apparatus, which multiplex and transmit power by a contactless configuration.

BACKGROUND ART

Conventionally, as a wireless power transmission apparatus, a configuration has been known which comprises a plurality of power transmitters that shift phase difference between their resonant magnetic fields within a range from 90 to 180 degrees and transmit them, thereby enabling power transmission while boosting them (see Patent Document 1, for example).

PRIOR ART DOCUMENT

Patent Document

Patent Document 1: WO2012/046453.

DISCLOSURE OF THE INVENTION

Problems to be Solved by the Invention

The apparatus of the Patent Document 1, however, aims at boosting the voltage, and does not consider problems concerning the multiplex transmission. Thus, the apparatus brings about shared magnetic flux between the antennas of the individual channels, thereby presenting a problem of causing mutual interference between the plurality of antennas. In addition, as the phase difference between the resonant magnetic fields approaches 180 degrees, the directions of the magnetic fluxes of the antennas are inverted and are cancelled to each other. This offers a problem of reducing the amount of energy of power transmission.

For this reason, to carry out the multiplex transmission in the conventional apparatus, it is difficult to place the antennas of the individual channels close to each other. Then, to reduce the effect of the mutual interference between the antennas, it is necessary to dispose the individual channels separately by a distance greater than the transmission distance, or to apply magnetic shielding for separating the magnetic fluxes of the individual channels. Accordingly, it has a problem of being unable to reduce the size as the wireless power transmission system, and of entailing the cost for the magnetic shielding.

The present invention is implemented to solve the foregoing problems. Therefore it is an object of the present invention to provide a multiplex wireless power transmission system and transmitting-side multiplex wireless power transmission apparatus capable of multiplexing and transmitting power through contactless means with a small inexpensive configuration.

Means for Solving the Problem

A multiplex wireless power transmission system in accordance with the present invention comprises: a primary transmission power supply that provides single frequency power; a transmitter-receiver including plural channels of transmitting antennas that wirelessly transmit power provided from the primary transmission power supply and plural channels of receiving antennas that receive the power transferred from the paired transmitting antennas; plural channels of transmission power circuits that establish resonance conditions of the paired transmitting antennas; and plural channels of receiving power circuits that establish resonance conditions of the paired receiving antennas, wherein the individual transmission power circuits provide the transmitting antennas of adjacent channels with powers with half-wave resonance waveforms that avoid a period during which the power waves overlap on each other by shifting a phase of voltage or current of the powers.

Advantages of the Invention

According to the present invention, since it has the foregoing configuration, it is capable of achieving highly efficient multiplex power transmission through a fixed single transmission frequency, and of facilitating the design that satisfying the regulations of the Radio Law. As a result, it can increase the transmission power and simplify the electromagnetic shielding structure, thereby being able to implement low cost development into a product without complicated design. In addition, since it can prevent the problem of mutual interference caused by reducing the antenna distance between the individual channels, it can downsize the apparatus.

BEST MODE FOR CARRYING OUT THE INVENTION

The best mode for carrying out the invention will now be described with reference to the accompanying drawings to explain the present invention in more detail.

Embodiment 1

Figure 1:
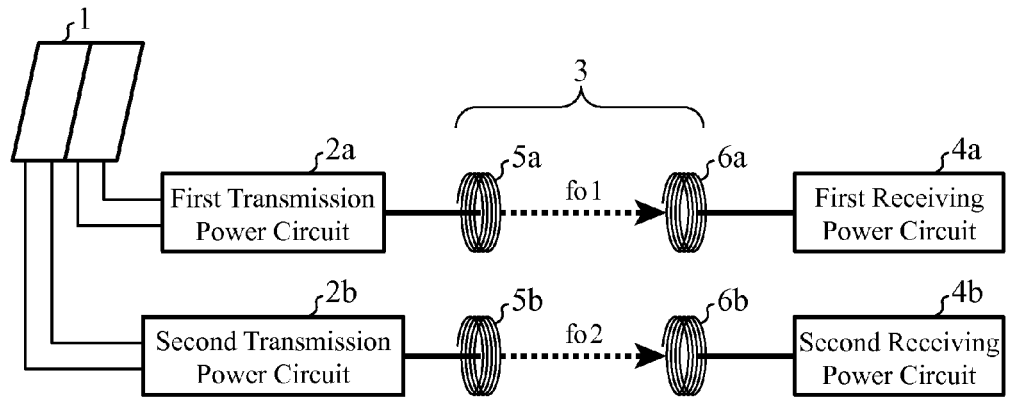
FIG. 1 is a diagram showing a configuration of a multiplex wireless power transmission system of an embodiment 1 in accordance with the present invention.

FIG. 1 is a diagram showing a configuration of a multiplex wireless power transmission system of an embodiment 1 in accordance with the present invention.

The multiplex wireless power transmission system is an apparatus that wirelessly transmits plural channels of powers including an electric signal in parallel. As shown in FIG. 1, the multiplex wireless power transmission system comprises a primary transmission power supply 1, transmission power circuits 2, a transmitter-receiver 3 and receiving power circuits 4. In addition, the transmitter-receiver 3 comprises transmitting antennas 5 and receiving antennas 6. Then to carry out multiplex transmission, the multiplex transmission system comprises plural channels of the transmission power circuits 2, transmitting antennas 5, receiving antennas 6 and receiving power circuits 4 (FIG. 1 shows an example having two channels, and the individual components are referred to by the reference numerals and the suffixes a and b affixed to them). In the multiplex transmission system shown in FIG. 1, the primary transmission power supply 1, transmission power circuits 2 and transmitting antennas 5 constitute the transmitting-side multiplex wireless power transmission apparatus, and the receiving antennas 6 and receiving power circuits 4 constitute a receiving-side multiplex transmission apparatus.

The primary transmission power supply 1 provides single frequency power to the individual transmitting antennas 5 via the individual transmission power circuits 2.

The transmission power circuits 2 are disposed between the primary transmission power supply 1 and the transmitting antennas 5 to establish resonance conditions of the paired transmitting antennas 5 by resonance impedance control. At this time, it carries out tuning to the resonance frequency and performs waveform control of the power provided to the transmitting antennas 5. Details of the waveform control will be described later.

The transmitting antennas 5 wirelessly transmit the power provided from the primary transmission power supply 1 via the paired transmission power circuits 2 to the receiving antennas 6.

The receiving antennas 6 receive the power transferred from the paired transmitting antennas 5. The power received with the receiving antennas 6 is provided to load equipment or the like (not shown) via the receiving power circuits 4.

The receiving power circuits 4 are placed between the receiving antennas 6 and the load equipment or the like to establish the resonance conditions of the paired receiving antennas 6 by input impedance control. At this time, it carries out tuning of the resonance frequency (fo1=fo2 shown in FIG. 1).

Incidentally, as for the wireless transmission method of the transmitter-receiver 3, it is not particularly specified. For example, it can be a method using magnetic field resonance, electric field resonance, or electromagnetic induction.

Figure 2:
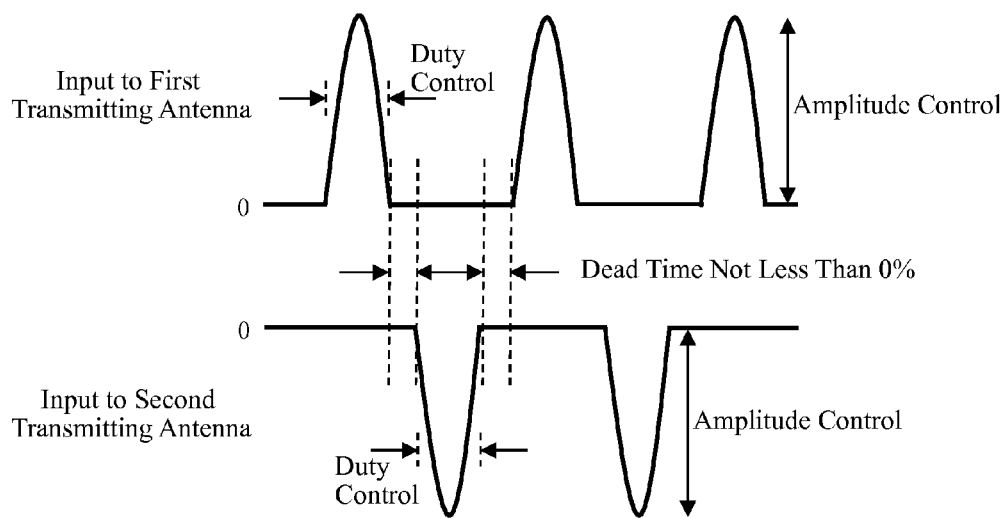
FIG. 2 is a schematic diagram showing an example of voltage/current waveforms of transmitting antennas of the embodiment 1 in accordance with the present invention.

Next, the waveform control of the power by the transmission power circuits 2 will be described with reference to FIGS. 2 and 3. FIG. 2 is a schematic diagram showing an example of the voltage or current waveforms of the powers provided to the transmitting antennas 5 in the embodiment 1 in accordance with the present invention; and FIG. 3 is a diagram showing an example of magnetic flux directions between the transmitting antennas 5 and the receiving antennas 6 for the individual channels on this occasion.

As shown in FIG. 2, the individual transmission power circuits 2 carry out, between the adjacent channels, waveform control of the powers provided from the primary transmission power supply 1 to the individual transmitting antennas 5 in such a manner that they take half-wave resonance waveforms without any overlap between the waveforms (that is, the dead time is not less than 0%) by shifting the phase of the voltage or current. At the same time, it adjusts the power level by performing the amplitude control and duty control. Incidentally, the example shown in FIG. 2 creates a half-wave resonance waveform in the positive direction for the power provided to the first channel transmitting antenna 5a, whereas it creates a half-wave resonance waveform in the negative direction for the power provided to the second channel transmitting antenna 5b.

Figure 3:
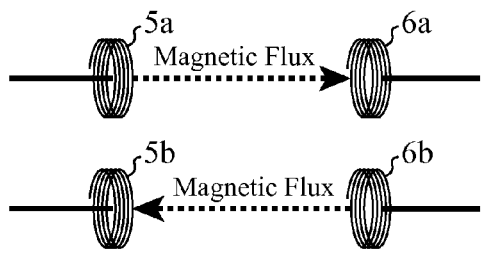
FIG. 3 is a diagram showing an example of magnetic flux directions between the transmitting antennas and receiving antennas of the individual channels in the embodiment 1 in accordance with the present invention.

Thus, as shown in FIG. 3, the magnetic flux of the first channel faces in the direction opposite to the magnetic flux of the second channel. In addition, since the dead time is controlled at not less than 0%, no magnetic flux appears in both channels at the same time during the energy transmission and no cancellation of the magnetic flux occurs. Accordingly, the present embodiment can avoid the mutual interference in the individual channels, thereby being able to carry out the multiplex power transmission.

Figure 4:
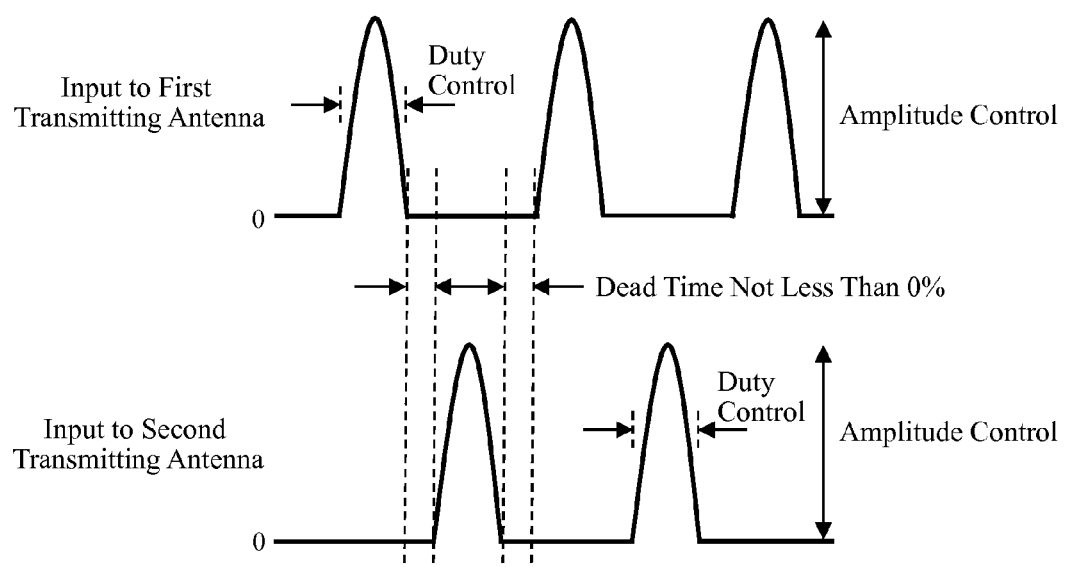
FIG. 4 is a schematic diagram showing another example of the voltage/current waveforms of the transmitting antennas in the embodiment 1 in accordance with the present invention.

Incidentally, although FIG. 2 shows an example employing the half-wave resonance waveforms with the directions opposite to each other, it is also possible to user half-wave resonance waveforms in the same direction as shown in FIG. 4. In this case, however, although the mutual interference between the channels can be avoided, it becomes more difficult to reduce the distance between the antennas of the individual channels as compared with the case of FIG. 2.

As described above, according to the present embodiment 1, it is configured in such a manner that the individual transmission power circuits 2, concerning the individual powers provided to the transmitting antennas 5 between the adjacent channels, shift the phase of the voltage or current so as to create the half-wave resonance waveforms without overlaps between them. Accordingly, it can enable highly efficient multiplex power transmission through a fixed single transmission frequency, and facilitate a design that satisfies the regulations of the Radio Law using the ISM (the industrial, scientific and medical) band. As a result, it can increase the transmission power and simplify the electromagnetic shielding structure, thereby being able to implement a low cost development into a product without a complicated design. In addition, since it can prevent the mutual interference because of bringing the antennas closer to each other between the channels, it can downsize the apparatus. Furthermore, when placing a plurality of single channel wireless power transmission apparatuses in a close range, it can avoid the problem of the mutual interference in the individual channels by carrying out the phase control of the voltage and current between the individual transmission power supplies.

Incidentally, although the embodiment 1 shows an example in which the transmitting antennas 5 and receiving antennas 6 are each comprised of a single coil, this is not essential. For example, each coil can be comprised of a feeder coil and a resonance coil, or two or more coils.

In addition, as for the receiving antennas 6, their resonance conditions vary owing to the distance between them and the paired transmitting antennas 5, or to the load current and load impedance or the like. Thus, it is also possible to provide the receiving-side circuits 4 with a function of varying the resonance conditions to be established for the receiving antennas 6 in accordance with such transmission conditions. Likewise, the transmitting-side circuits 2 can be provided with a function of varying the resonance conditions of the transmitting antennas 5. Furthermore, both the circuits 2 and 4 can be provided with the function of varying the resonance conditions of the individual antennas 5 and 6.

Incidentally, it is to be understood that variations of any components of the individual embodiments or removal of any components of the individual embodiments is possible within the scope of the present invention.

INDUSTRIAL APPLICABILITY

A multiplex wireless power transmission system in accordance with the present invention is configured in such a manner that the individual transmission power circuits, as to the individual powers to be provided to the transmitting antennas between the adjacent channels, shift the phase of the voltage or current so as to create the half-wave resonance waveforms that avoid a period during which the waves overlap on each other, thereby being able to carry out the highly efficient multiplex power transmission through the fixed single transmission frequency. Accordingly, it is suitable for an application to the wireless power transmission using the ISM band or to the wireless power transmission using a small apparatus.

DESCRIPTION OF REFERENCE SYMBOLS

1 primary transmission power supply; 2, 2a, 2b transmission power circuit; 3 transmitter-receiver; 4, 4a, 4b receiving power circuit; 5, 5a, 5b transmitting antenna; 6, 6a, 6b receiving antenna.

What is claimed is:

1. A multiplex wireless power transmission system comprising:
    a primary transmission power supply that provides single frequency power;
    a transmitter-receiver including plural channels of transmitting antennas that wirelessly transmit power provided from the primary transmission power supply and plural channels of receiving antennas that receive the power transferred from the paired transmitting antennas;
    plural channels of transmission power circuits that establish resonance conditions of the paired transmitting antennas; and
    plural channels of receiving power circuits that establish resonance conditions of the paired receiving antennas, wherein
    the individual transmission power circuits provide the transmitting antennas of adjacent channels with powers with half-wave resonance waveforms that avoid a period during which the power waves overlap on each other by shifting a phase of voltage or current of the powers.

2. The multiplex wireless power transmission system according to claim 1, wherein the transmitter-receiver carries out wireless transmission using magnetic-field resonance.

3. The multiplex wireless power transmission system according to claim 1, wherein
    the transmitter-receiver carries out wireless transmission using electric-field resonance.

4. The multiplex wireless power transmission system according to claim 1, wherein
    the transmitter-receiver carries out wireless transmission using electromagnetic induction.

5. The multiplex wireless power transmission system according to claim 1, wherein
    the transmitting antennas and the receiving antennas are each comprised of two or more coils.

6. The multiplex wireless power transmission system according to claim 1, wherein
    the receiving power circuits vary the resonance conditions of the receiving antennas in accordance with a transmission state of the receiving antennas.

7. The multiplex wireless power transmission system according to claim 1, wherein
    the transmission power circuits vary the resonance conditions of the transmitting antennas in accordance with a transmission state of the transmitting antennas.

8. A transmitting-side multiplex wireless power transmission apparatus comprising:
    a primary transmission power supply that provides single frequency power;
    plural channels of transmitting antennas that wirelessly transmit power provided from the primary transmission power supply; and
    plural channels of transmission power circuits that establish resonance conditions of the paired transmitting antennas, wherein
    the individual transmission power circuits provide the transmitting antennas of adjacent channels with powers with half-wave resonance waveforms that avoid a period during which the power waves overlap on each other by shifting a phase of voltage or current of the powers.

* * * * *